United States Patent [19]

Petersen et al.

[11] 4,292,377
[45] Sep. 29, 1981

[54] GOLD COLORED LAMINATED COMPOSITE MATERIAL HAVING MAGNETIC PROPERTIES

[75] Inventors: Walter A. Petersen, Ridgewood; Jonathan A. Travis, Oak Ridge; Frank A. Badia, Ringwood, all of N.J.

[73] Assignee: The International Nickel Co., Inc., New York, N.Y.

[21] Appl. No.: 114,310

[22] Filed: Jan. 25, 1980

[51] Int. Cl.³ .................... B32B 15/04; B32B 15/18
[52] U.S. Cl. .................... 428/675; 428/676; 428/680; 428/681; 428/925; 428/926; 428/940
[58] Field of Search ............ 428/635, 671, 675–683, 428/928, 925, 926, 940

[56] References Cited

U.S. PATENT DOCUMENTS

| | | | |
|---|---|---|---|
| 1,077,977 | 11/1913 | Fuller | 428/671 |
| 2,037,733 | 4/1936 | Mudge | 29/188 |
| 2,707,323 | 5/1955 | Watson | 29/470.9 |
| 3,212,865 | 10/1965 | Miller | 29/196.3 |
| 3,397,045 | 8/1968 | Winter | 29/191 |
| 3,407,050 | 10/1968 | Trapp et al. | 428/671 |
| 3,416,915 | 12/1968 | Mikawa | 75/159 |
| 3,470,607 | 10/1969 | Rader | 29/470.1 |
| 3,721,535 | 3/1973 | Pryor | 428/675 |
| 3,750,253 | 8/1973 | Miller | 29/196.3 |
| 3,832,147 | 8/1974 | Forand, Jr. | 29/191 |
| 3,912,152 | 10/1975 | Forand, Jr. | 228/190 |
| 4,103,076 | 7/1978 | Ulam | 428/653 |
| 4,113,475 | 9/1978 | Smith | 75/159 |

OTHER PUBLICATIONS

Spalding, W. F., *Tate's Modern Cambist: Centenary Edition,* Banbers Publishing Co., London, pp. 262–265 (1929).

*Primary Examiner*—Michael L. Lewis
*Attorney, Agent, or Firm*—Raymond J. Kenny; Edward A. Steen

[57] ABSTRACT

A novel laminated composite material of gold-colored appearance especially suited for, but not limited to, coinage applications has a ferromagnetic core located between sheathing layers of a Cu-Al or Cu-Ni-Al alloy and separated therefrom by layers of copper. Alternative methods involving hot and/or cold rolling techniques are provided for the production of the novel laminates.

5 Claims, 2 Drawing Figures

GOLD COLORED LAMINATED COMPOSITE MATERIAL HAVING MAGNETIC PROPERTIES

FIELD OF THE INVENTION

The present invention relates to laminate materials and methods of producing them. More particularly, it is concerned with composite materials for use in manufacturing gold-colored coins and other products having desired magnetic properties.

BACKGROUND OF THE INVENTION

Materials used by governments for coinage production generally have to possess various functional properties in addition to being difficult to imitate by counterfeiters. Desired characteristics include the color of the material, its ability to resist tarnishing and wear under typical handling conditions, and possibly desired magnetic properties to ensure fool-proof recognition of coins by vending machines. Moreover, for ease of manufacture, materials are required which possess acceptable hot and/or cold workability coupled with a final hardness which will provide the desired abrasion resistance in the finished coins. Finally, the material selection is, of course, affected by the need to ensure that the cost of a finished coin is exceeded by its face value.

The desird combination of characteristics sought may be impossible to achieve with any single alloy. Accordingly, it is becoming increasingly frequent to make use of composite materials wherein, for example, a core chosen for its magnetic properties, or simply its cheapness, is used in combination with an outer cladding of an alloy possessing the desired color as well as the tarnish and abrasion resistance. When composites are used, it is becoming increasingly important to ensure that scrap produced will be of a composition suitable for remelting to produce useful commercial alloys. Various laminates are described in the art and various processes for producing them make use of hot/or cold rolling.

OBJECT OF THE INVENTION

The present invention is aimed at providing novel composite materials which are particularly suitable for the production of coins of gold-colored appearance having predetermined magnetic properties, as well as providing processes for the manufacture of such composites.

SUMMARY OF THE INVENTION

The present invention provides a composite material which comprises a five-layered laminate having a central core layer of ferromagnetic metal or alloy selected from the group consisting of nickel, iron and alloys thereof, a pair of intermediate layers of essentially pure copper, each intermediate layer being bonded to a respective one of opposed surfaces of the core, and a pair of sheathing layers each of which is bonded remotely from said core to a respective surface of one of said intermediate layers, each of the sheathing layers consisting of an alloy which comprises, by weight: 0.5 to 10% Al, 0 to 9.5% Ni, the balance being copper in an amount of at least 85%.

Unless otherwise specified all compositions quoted in the present specification and claims are in percentages by weight. The term "essentially pure" is used herein to designate metal of generally accepted commercial grade. In the case of nickel used as core material in the composites of the invention, the metal may contain impurity amounts of common constituents such as carbon, silicon, manganese, iron, copper, and aluminum.

In accordance with one aspect of the invention, the materials in question are produced by forming a pack of the appropriate five metallic layers, welding at least portions of of edges of the pack to maintain the layers in their superimposed relationship to one another, subjecting the pack to a hot rolling operation carried out at from about 650° to 1000° C. and controlled to ensure that the reduction in pack thickness achieved per rolling pass exceeds a predetermined minimum for the rolling temperature used, which minimum is 25% for a rolling temperature of 650° C. and about 40% for a rolling temperature of 1000° C., and thereafter cold rolling the product to its desired gauge. It is preferred that the pack be welded all-around prior to rolling. Partial welding of the edges can be used, however, providing that in such a case the pack is maintained in an inert or a reducing atmosphere when hot.

In accordance with another aspect of the invention, the laminate may be produced without resorting to hot rolling. In such a case a pack of appropriate layers is cold bonded by subjecting it to a rolling operation in which the pack thickness is reduced by at least 65% in a single pass. Thereafter the bonded pack is heat treated at a temperature of from about 650° to about 1000° C. for a period of at least about 5 minutes. The heat-treated product can then be cold-rolled to its desired gauge.

DETAILED DESCRIPTION OF THE EMBODIMENTS

The core material which is chosen to impart to the coins their desired magnetic properties can be nickel, an alloy consisting primarily of nickel, or alternatively it can be iron or steel. An iron-based material might give rise, upon long term storage in a humid environment, to some corrosion at the coin edge where the core is exposed. This might be tolerable in view of its being confined to a relatively small area of the coin and since normal handling would wear away any corrosion products. However, it will generally be preferable to avoid such corrosion by resorting to a core of essentially pure nickel.

In general, the intermediate layers of copper will be very thin, typically each copper layer will represent as little as about 1% or as much as about 6% of the thickness of the finished material. The core thickness may be as little as about 3.5% or as much as about 85% of the overall thickness of the finished product, while each sheathing layer may have a thickness representing from about 5 to about 45% of the product's overall thickness.

The precise composition of the sheathing alloy will be selected in accordance with the specific properties required. While many copper-base alloys containing not more than 15% total of nickel and aluminum are suitable for such use, it is generally preferred that the sum of the nickel and aluminum contents be not greater than 9% and that the nickel content be less than 5%. Examples of suitable sheathing alloys include those having the nominal compositions: Cu-8%Al, Cu-2%Al-6%Ni, as well as Cu-6%Al-2%Ni. The last mentioned alloy is particularly preferred inasmuch as it has proven characteristics of workability and tarnish resistance, such alloy having been used, for example, by the French and Danish governments for coins of non-laminated structure.

The use of an intermediate copper layer has been found to be essential to the successful production of laminates having a nickel core and an aluminum containing sheathing alloy. Attempts to make three-layered laminates in which no copper intermediate layer was used proved unsuccessful in that delamination was observed after hot or cold rolling. The inability to achieve a good bond when the core and sheathing alloy were in direct contact is believed to be attributable to formation of brittle intermetallic compounds of nickel and aluminum at the bonding interface. A copper layer between the nickel core and the sheathing alloy has been found to enable excellent bonding to be achieved. To ensure adequate protection against formation of the undesired intermetallic compounds, the copper layer used must be such as to ensure a minimum thickness of the order of 10 mm in the final product.

Whether the product is produced by hot or cold bonding techniques, careful control of the rolling operations is critical to production of acceptable laminate strip. Where a cold processing route is chosen, it is essential that the mill used be capable of withstanding the very high separating forces dictated by the need to accomplish in a single pass a thickness reduction of at least 65%. After bonding has been performed, and the product has been annealed, cold rolling to the desired gauge can be achieved with comparatively smaller thickness reductions per roll pass.

In some instances, it can be inconvenient to cold bond five separate layers particularly in already existing equipment designed for three layer laminates. The use of more than one cold bonding operation to produce the laminate is considered within the scope of the present invention. By way of illustration, a copper layer is first bonded to one side of a copper-aluminum containing alloy. Subsequently, this two layer laminate is roll bonded to a nickel or iron central core. Similarly, copper layers could be cold roll bonded to a nickel or iron central layer. In a subsequent cold rolling bonding operation, the other copper-aluminum containing alloy outer layers are added.

When hot rolling is used, the demands made on the rolling mill are far more modest for a given width in view of the material's lower resistance to deformation at elevated temperature. Nevertheless, it is essential that the reduction in thickness exceed a minimum value in order to achieve good bonding. We have found that the minimum reduction needed decreases from about 40% at 1000° C. to about 25% at 650° C. It will often be necessary to employ more than one pass at a higher temperature and when this is done the minimum reduction criterion must be observed in each pass. Thus we have found that when a pack was rolled at 1000° C. with a 50% reduction in thickness during the first pass to achieve bonding, further hot rolling with a thickness reduction of only 17–24% per pass proved insufficient to maintain the bonding, and delamination occurred.

As well as observing the above minimum reduction criteria it is essential to avoid excessive reduction during the hot rolling operation. Thus we have found that a rolling operation controlled to produce a thickness reduction of 67% at 1000° C. resulted in failure to produce a bonded strip. In that test the nickel core burst through the welded edges of the pack and was extruded therefrom. In general therefore, the reduction achieved per hot rolling pass should not exceed about 65% and preferably should be less than about 60%.

A number of examples of laminates in accordance with the invention and their method of preparation will now be described in more detail.

BRIEF DESCRIPTION OF THE DRAWINGS

The accompanying drawings illustrate the construction of a multi-layered pack used in the examples for producing a coinage material in accordance with the invention.

EXAMPLES

Figure 1:
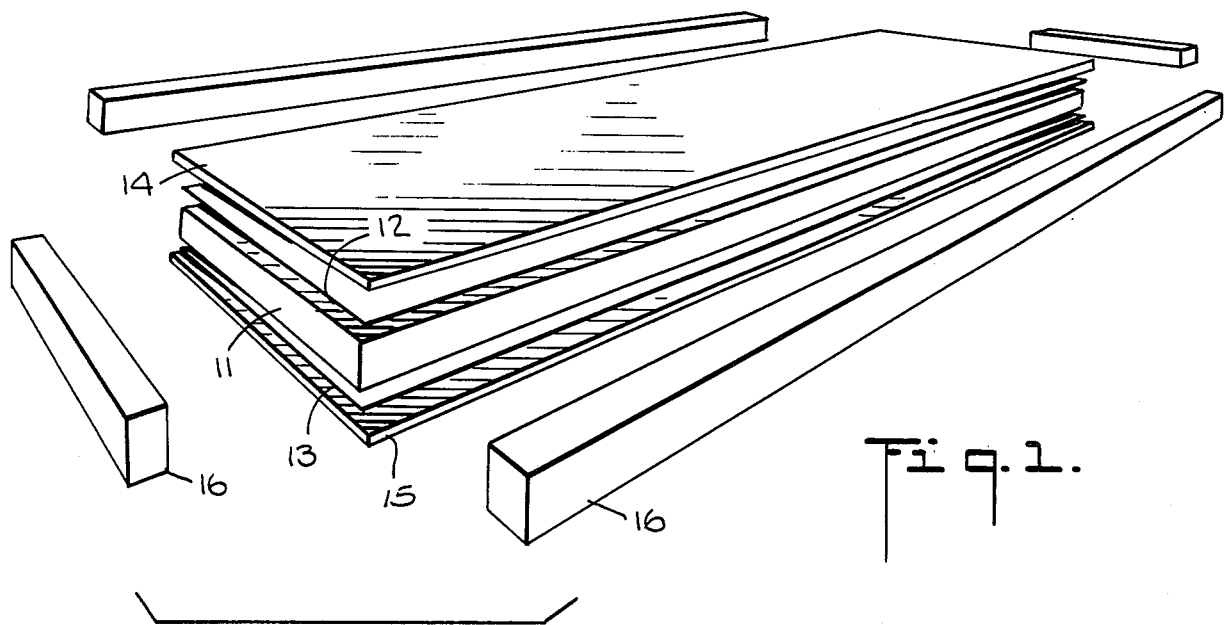
FIGS. 1 and 2 show the pack before and after assembly respectively.
Figure 2:
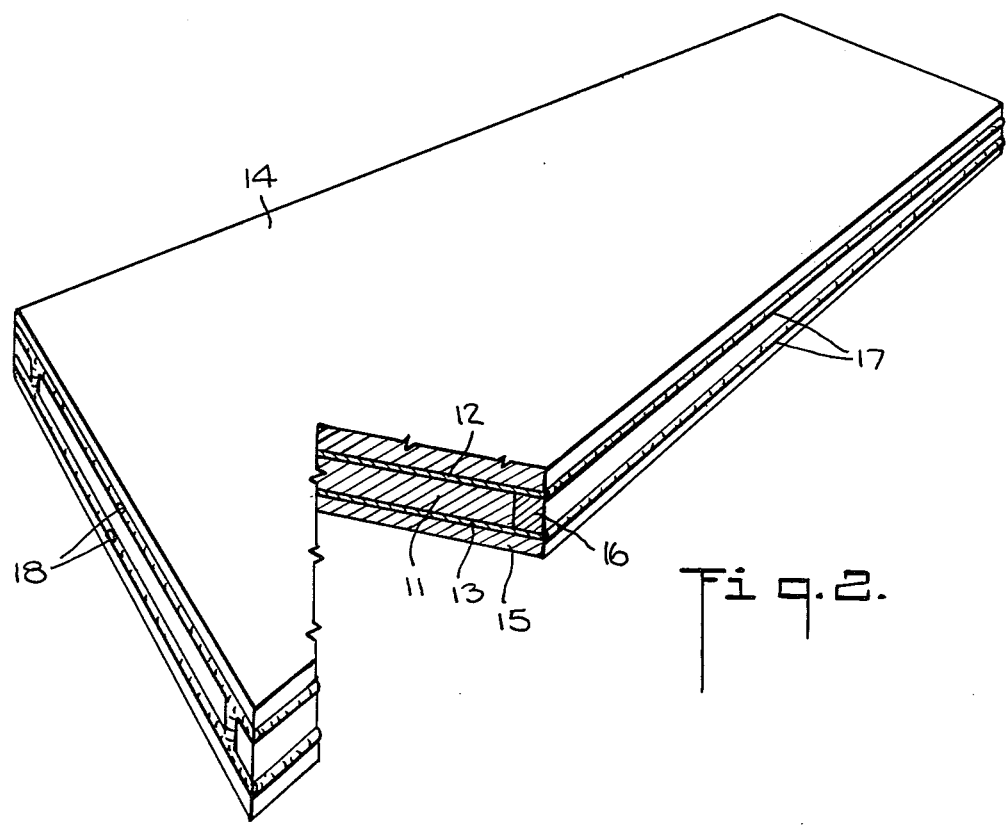

A series of tests were carried out using as sheathing material a Cu-Al-Ni alloy which had been prepared by induction melting in air with a 0.003% phosphorus addition as deoxidant. Chemical analysis showed that the copper alloy contained 5.6% Al, 2.7% Ni and 0.002% P. Ingots of the alloy were hot rolled to 10 mm plate, ground and then cold rolled as desired to sheets of between 0.6 and 6 mm thickness. The nickel used as core material was commercially air melted stock and contained 0.01% C, 0.25% Mn, 0.06% Si, 0.18% Fe, 0.10% Cu, the balance being nickel.

For the intermediate layers 1.3 mm thick sheet copper was obtained commercially and where desired it was cold-rolled to thinner gauge.

A five-layered pack was prepared by stacking in the appropriate manner strips of material which were about 60 cm long and 30 cm wide. The strips consisted of a 21.3 mm thick nickel strip, flanked by copper layers each 1.3 mm thick and sheathing layers each 3.8 mm thick. The sheathing layers were of slightly greater surface area than the inner layers and, in the resulting overlap, strips of the sheathing alloy were placed as a dam all around the pack. The pack was then gas tungsten-arc welded around its periphery using MONEL (a registered trademark of the International Nickel Company) Filler Metal 67, thereby completely enclosing the core materials. A pair of vent holes were drilled at one end of the pack to permit equilization of external and internal air pressure during heat-up. The pack produced in this way is illustrated schematically in the drawings wherein the core 11 is seen to be sandwiched between copper layers 12 and 13, which separate it from the sheathing layers 14 and 15. The reference numeral 16 is used to designate the strips of sheathing alloy used as a dam along the edges of the pack. The welds 17 are seen to seal off the whole periphery of the pack except for the vent holes 18 provided at one of the edges.

The pack was then soaked at 1000° C. for 1½ hours and then fed at that temperature to a rolling mill in which the thickness thereof was reduced in 6 passes by 37.5, 33.3, 30, 29, 40 and 35% respectively. The resulting hot band was then allowed to cool and was examined to ascertain the effectiveness of the bonding. Visual examination as well as destructive testing with a hammer and chisel proved that satisfactory bonding had been achieved.

The hot band was further treated as follows. The edges were sheared and the surface thereof cleaned by abrasive grinding. The band was then cold rolled to strip to achieve a total reduction of 73% in its thickness by means of 11 passes. The cold rolling was performed without any annealing. Inspection of the cold rolled strip revealed no delamination. Blanks were punched from the strip and rimmed. The rimmed blanks were then annealed for about ½ hour at 760° C. in a cracked ammonia atmosphere and embossed using an operating pressure of 825 MPa to produce coins of excellent quality and appearance.

The cold rolled strip produced in the manner described above had a 0.78 mm thick core, 0.05 mm thick intermediate copper layers and 0.20 mm thick sheathing layers. Scrap which resulted from the blanking operation carried out on this strip contains, when melted, about 62% nickel, 36% copper and 2% aluminum. Such a melt is well suited for the preparation of known commercial alloys such as those containing about 70% nickel and 30% copper (e.g., MONEL alloy 400).

The procedure above was also used to produce coins wherein the sheathing alloy contained varying amounts of nickel and aluminum, though the sum of the aluminum and nickel contents was maintained a. less than 10%. Coins were subjected to tests simulating pocket storage and handling and were exposed above the surface of an artificial sweat solution. While many of the coins were found to exhibit acceptable behavior in all these tests, those containing at least 2% Al showed particularly good performance in a wear test. As an additional evaluation of the quality of the material, the bonded strip was subjected to bend testing. The strip was found to withstand a 180° bend test without any sign of delamination.

We have prepared by the above described technique laminates having an overall thickness of 1.4 mm wherein the thickness ratio of the core to the cladding (single layer) was as little as about 1:3 or as high as about 9:1, so that any of a wide range of magnetic properties can be selected for the finished coins.

The criticality of hot-rolling conditions is demonstrated by the following series of tests. For the purpose of these tests only three layers were used, i.e., one each of nickel, copper and Cu-6%Al-2%Ni alloy. The packs were prepared and bonded by the hot-rolling procedure described above, except that various temperatures and thickness reductions were used to assess their utility. In each case the starting pack consisted of a 12.1 mm nickel sheet, a 1.3 mm copper sheet and a 3.8 mm sheathing alloy sheet. The packs were soaked for one hour at a temperature chosen between 650° C. and 1000° C. and subsequently hot-rolled to achieve single pass reductions ranging from 14 to 44%. The hot bonded strip was examined visually as well as destructively tested by hammer and chisel, and the results are shown in Table 1.

TABLE 1

| Soaking Temp (°C.) | Single Pass Reduction (%) | Bond Quality | |
|---|---|---|---|
| | | Visual Examination | Chisel Test |
| 650 | 41.9 | S | S |
| 650 | 28.5 | S | S |
| 650 | 19.0 | U | — |
| 650 | 14.1 | U | — |
| 760 | 43.7 | S | S |
| 760 | 30.8 | S | S |
| 760 | 16.0 | S | U* |
| 870 | 43.8 | S | S |
| 870 | 28.0 | S | U |
| 870 | 15.1 | U | — |
| 1000 | 44.3 | S | S |
| 1000 | 40.0 | S | S |
| 1000 | 31.4 | S | U |
| 1000 | 17.8 | S | U |

S = satisfactory quality, no delamination observed
U = unacceptable quality, delamination observed or induced by hammer and chisel
* = quality was borderline in that delamination could only be induced by considerable effort The results show that in preparing the laminates of the invention by hot bonding a minimum reduction has to be achieved to ensure good bonding. As stated earlier this minimum, which is dependent on the rolling temperature, is needed not only during the first pass but also during subsequent passes of the hot-rolling operation.

To evaluate the feasibility of cold bonding, two five-ply packs were prepared using a 6.35 mm thick nickel core, 0.13 mm thick copper intermediate layers and 0.5 mm thick Cu-6%Al-2%Ni sheathing layers. The surfaces of the nickel core and the inner surfaces of the Cu-6%Al-2%Ni sheathing layers were power wire brushed just prior to rolling using a stainless steel brush. The first 7.6 mm thick pack was cold-rolled to reduce its thickness by 72% in a single pass, giving a strip of about 2.2 mm thickness. This strip was annealed at 760° C. for 15 minutes and then cold-rolled with a 34% reduction in 3 passes to a final thickness of 1.4 mm. Three out of four rimmed blanks produced from this strip were satisfactory while the fourth exhibited minor delamination.

The second 7.5 mm thick pack was cold-rolled with a 78% reduction in a single pass to a 1.65 mm thickness. After a 17 minute anneal at 760° C., the strip was given a further 14% reduction in thickness by cold-rolling it to 1.4 mm in two passes. Representative samples from the two pieces of strip were bent through 180° with no sign of delamination.

In a third pack prepared by cold roll bonding, a two-step procedure was followed wherein copper was first bonded to Cu-6%Al-2%Ni and subsequently, two layers of this composite were bonded to a nickel core. The mating surfaces of a 1.7 mm thick Cu-6%Al-2% Ni sheet and a 0.43 mm thick copper sheet were power wire brushed just prior to rolling, using a stainless steel wire brush. The 5 cm wide by 10 cm long pack was cold rolled about 67% in a single pass to provide a two-layer strip of about 0.7 mm thickness. Excellent bonding was obtained in this operation and microscopic examination showed that the copper layer was 0.11 mm thick and the Cu-6%Al-2%Ni layer was 0.58 mm thick. Following a 30-minute anneal at 760° C., the copper face of the two pieces cut from this composite were power wire brushed, using a stainless wire brush. These 3.8 cm wide by 10.2 cm long pieces were assembled as a pack about 4.4 mm thick nickel core. The copper surfaces of the first composite were in contact with the nickel core, which had also been power wire brushed on both sides. This 5.8 mm thick pack was cold rolled about 69% in one pass to 1.8 mm thick strip. The strip was annealed for 30-minutes at 760° C. and cold rolled about 22% to a final thickness of 1.4 mm. Ten coin blanks were punched from this strip and subjected to a rimming operation. Following this the blanks were annealed for 30 minutes at 760° C. in a cracked ammonia atmosphere. The blanks were embossed at an operating pressure of 825 MPa to produce coins of excellent quality in all respects. Samples of the annealed strip were bent 180° and flattened. Microscopic examination showed the excellent quality of this material in that there were no defects or delamination. The Cu-6%Al-2%Ni layers were 0.152 mm thick, the copper interlayers were 0.0254 mm thick, and the nickel core was 1.067 mm thick.

In another test to evaluate bond quality, 60 and 64 mm diameter blanks were cut from 0.76 mm thick composite sheet of this invention that had been previously annealed at 815° C. for 30 minutes. These were subjected to a deep drawing test procedure wherein the blanks were pushed by a 32 mm diameter mandrel through a 33.4 mm diameter die to provide cups about 20 and 25 mm high respectively. There was no evidence of delamination or tearing in these test pieces. This provided further evidence of the excellent quality of the metallurgical bond obtained in the composite material of this invention and also showed the capability for deep drawing.

It will be understood by those skilled in the art that the laminate material of this invention can be used for applications other than coinage requiring color, corrosion resistance, and magnetic properties. By way of illustrations, another area of application is cookware. The combination of excellent tarnish resistance in combination with the heat distributive properties of dual copper layers provides a material well suited for pots and pans.

The present invention has been described with reference to preferred embodiments thereof. It will be appreciated that various modifications may be made to the details of such embodiments without departing from the scope of the invention which is defined by the appended claims.

The embodiments of the invention in which an exclusive property or privilege is claimed are defined as follows:

1. A pressure bonded composite material comprising a multi-layered laminate having a central core layer of ferromagnetic metal or alloy selected from the group consisting of nickel, iron and alloys thereof, the core layer representing from about 3.5% to about 85% of the thickness of the composite, a pair of intermediate layers of essentially pure copper, each layer representing from about 1% to about 6% of the thickness of the laminate, each intermediate layer being bonded to a respective one of opposed surfaces of the core, and a pair of gold colored sheathing layers, each of which is bonded remotely from said core to a respective surface of one of said intermediate layers, each layer having a thickness representing from about 5% to 45% of the thickness of the laminate, each of the sheathing layers consisting of an alloy which comprises, by weight: 0.5 to 10% Al, 0 to 9.5% Ni, the balance being copper in an amount of at least 85% and layer edges at least partially welded together to maintain the layers in their superimposed relationship to one another prior to the application of pressure.

2. A composite material in accordance with claim 1 wherein said core layer consists of essentially pure nickel.

3. A composite material in accordance with claim 1 wherein the sum of nickel and aluminum contents of the sheathing alloy does not exceed 9%.

4. A composite material in accordance with claim 3 wherein the nickel content of the sheathing alloy is less than 5%.

5. A composite material in accordance with claim 4 wherein the sheathing alloy comprises 6% Al, 2% Ni, the balance being copper.

* * * * *